United States Patent [19]

Sauer et al.

[11] Patent Number: 4,559,734

[45] Date of Patent: Dec. 24, 1985

[54] WORM BAITING TOOL

[76] Inventors: Kenneth Sauer, P.O. Box A-199, Camarillo, Calif. 93010; Richard Fogo, 8841 Aberdare St., Ventura, Calif. 93004

[21] Appl. No.: 578,970

[22] Filed: Feb. 10, 1984

[51] Int. Cl.$^4$ .............................................. A01K 97/00
[52] U.S. Cl. .............................................................. 43/4
[58] Field of Search .................. 43/4, 4.5, 1; 66/116, 66/117, 118; 112/80; 139/380

[56] References Cited

U.S. PATENT DOCUMENTS

| | | | |
|---|---|---|---|
| 2,024,794 | 12/1935 | Carlson | 66/118 |
| 2,093,631 | 6/1936 | Burnham | 66/117 |
| 2,353,875 | 7/1943 | Burnham | 66/117 |
| 2,402,388 | 6/1944 | Franz | 66/118 |
| 2,690,026 | 9/1952 | King | 43/42.02 |
| 2,792,662 | 5/1955 | Norton | 43/42.24 |
| 2,866,494 | 12/1958 | Sanderson | 154/14 |
| 3,017,716 | 1/1962 | Hawks | 43/42.16 |
| 3,050,896 | 8/1962 | Parker | 43/4 |
| 3,165,858 | 1/1965 | Rutter | 43/42.53 |
| 3,193,962 | 7/1965 | Simpson | 43/4 |
| 3,385,619 | 5/1968 | Thomas | 43/1 |
| 3,925,919 | 12/1975 | Huth | 43/4 |
| 4,073,083 | 2/1978 | Davis | 43/4 |

Primary Examiner—Gene P. Crosby
Attorney, Agent, or Firm—Koppel & Harris

[57] ABSTRACT

A fishing leader is threaded through a worm or worm-like bait as follows. In one form, an elongated, narrow diameter tool is inserted at an entrance point near one end of the bait and pushed longitudinally through the bait until it exits near the other end of the bait. The end of the leader opposite the fish hook is attached to the tool, and the tool is withdrawn from the bait, which pulls the leader through the bait with the hook near the exit point and the end of the leader opposite the hook, through the entrance point where it can be connected to fishing line. In the other form of the tool, the end of the leader opposite the hook is first attached to the tool and then the tool and the leader are pushed through the worm in the opposite direction until the fish hook is near the entrance point of the tool and the other end of the leader is out of the exit point of the tool. The tool is then withdrawn from the worm leaving the leader in place.

5 Claims, 9 Drawing Figures

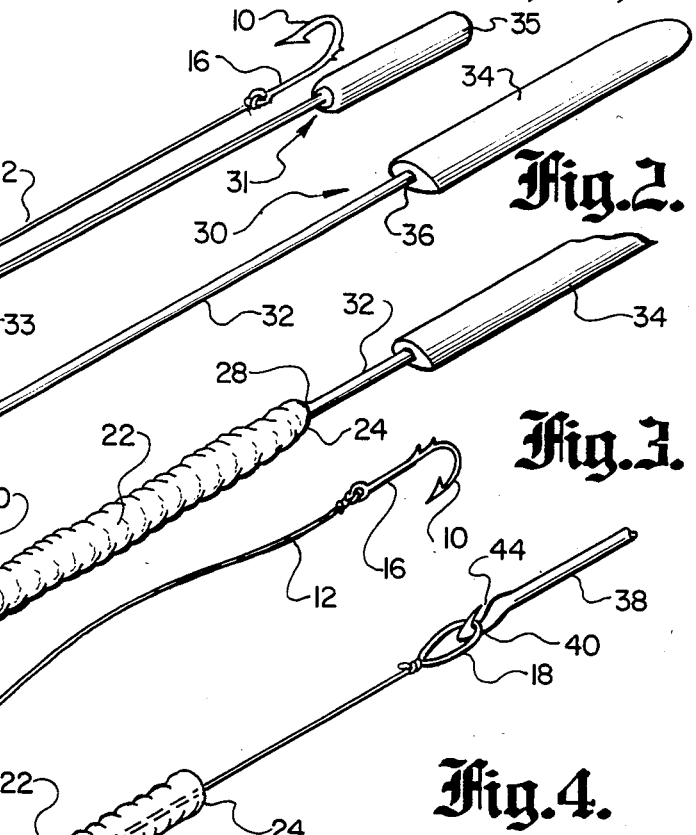
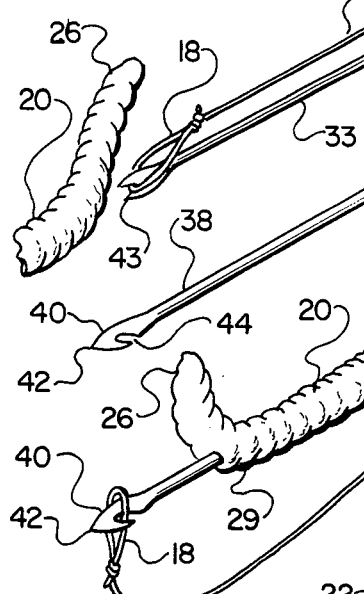
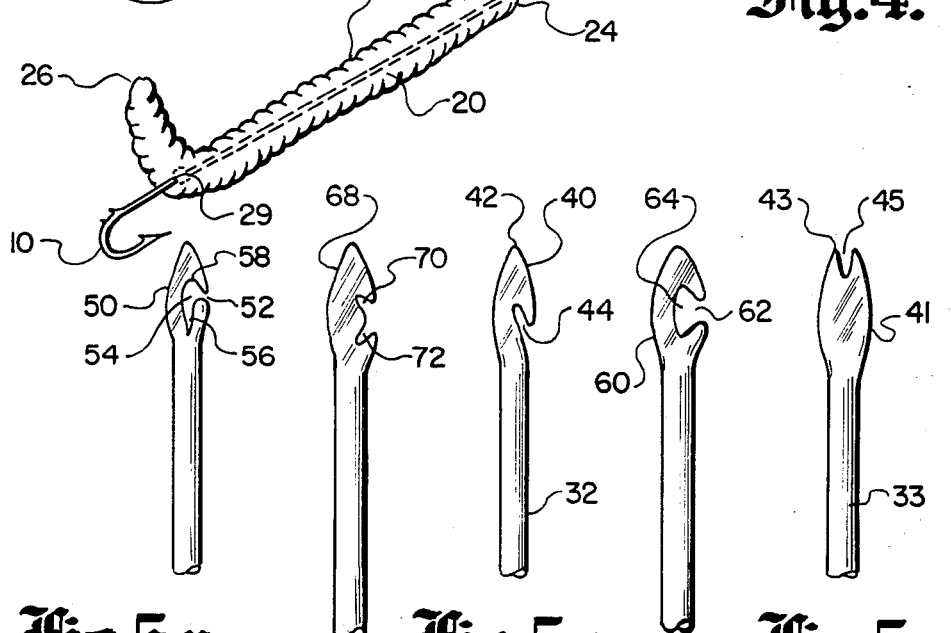

WORM BAITING TOOL

BACKGROUND OF THE INVENTION

1. Field of Invention

The present invention relates to a tool and method for attaching live bait, primarily earth worms and other worm-like bait to a hook for fishing.

2. Description of the Prior Art

Many fishermen prefer live bait to artificial lures. They believe that the live attracts the fish better. There has been no good method of attaching the fish hook to an earth worm, a popular bait. One typically hooks the center of the earth worm and wraps the head and tail around the shank of the hook. In short time, however, the worm loosens from the hook, and it can actually come off the hook resulting in lost bait. Even if the center stays attached to the hook, fish will frequently bite the loosened head or tail of the worm without engaging the hook. This is unsatisfactory.

Shrimp is another common bait, which is primarily used in deep-sea fishing. Typically, one hooks the back of a shrimp through its shell behind the head. The shrimp rarely loosens from the hook, but fish often bit the head or tail off without engaging the hook.

An object of the present invention is to disclose and provide a method for attaching a hook to bait in such a way that the bait is securely held by the hook, the bait looks natural to a fish, and the fish is substantially less likely to bite off a portion of the bait without being hooked. These and other objects, which will be evident in the specification, are met by the present invention.

The method can be accomplished in two ways. In the first, one pushes an end of an elongated, narrow diameter tool longitudally through the bait from an entrance point at the head of the bait to an exit point near the tail. The end of the leader opposite the fish hook is temporarily attached to the end of the tool that was pushed through the bait. The tool is then withdrawn from the bait, which pulls the leader through the bait. The end of the leader that had been attached to the tool extends out of the entrance point at the head of the bait and the other end of the leader, which is attached to the fish hook, extends out of the bait near its tail. In the other method, the leader is attached to the tool before it is inserted in the bait, with the hook end next to the shank of the tool. The tool is then inserted in the bait adjacent its tail and pushed through the bait until the end of the tool exits the head of the bait. This operation also carries the leader through the bait. When the end of the tool and the end of the leader exit the head of the bait, the tool disengages the leader and is withdrawn back through the bait leaving the end of the leader extending out of the head and the hook end of the leader extending out of the bait near its tail. Various tools are disclosed for accomplishing this end.

BRIEF DESCRIPTION OF THE DRAWINGS

FIG. 1 shows a perspective view of one tool used with one embodiment of the method of the present invention in perspective.

FIG. 2 shows a modified tool in perspective used in a second embodiment of the method of the present invention.

FIG. 3 shows the tool of FIG. 2 inserted through the head of a worm and extending out of tail end with the tool holding the leader and a fish hook.

FIG. 4 is another perspective view of the tool used in the second embodiment of the present invention showing the end of the tool removed from the worm and the leader remaining through the center of the worm'body.

FIG. 5a–5e are plan views of possible ends for the tool used in the method of the present invention.

DETAILED DESCRIPTION OF PREFERRED EMBODIMENT

Fishing uses a baited fish hook 10 (FIGS. 1 and 3), which is conventionally attached to one end of leader 12. The other, looped end 18 of leader 12 is conventionally attached to a fishing line. When using elongated bait such as worm 20, it is conventional to stick the fish hook through the center 22 of worm 20 and to wrap the head end 24 and the tail end 26 around shank 16 of fish hook 10. Movement of the worm on the fish hook, or movement of the hook and bait through the water tends to loosen the worm from the fish hook. As the head and tail ends unwrap from the shank of the fish hook, the portion of the worm that extends away from the fish hook may be bitten by a fish without having the fish engage the fish hook.

The method of the present invention utilizes the tool shown in the drawings. Referring first to FIG. 2, tool 30 has an elongated, narrow diameter shaft 32 of rigid corrosion-resistant material such as stainless steel or plastic. Shaft 32 may be circular, elliptical, pentoagonal or any desired shape in crosssection as long as it retains its rigidity and is narrow.

One end of shaft 32 is secured in handle 34. The handle may be in a variety of shapes and materials, but wood and plastic are generally preferred. Tool 30 could be used without a handle, but handle 34 helps to grip the tool. The handle could be replaced by a closed loop formed at the handle end 36 of shaft 32. The availability of inexpensive handles such as handle 34 probably makes the use of a wood or plastic handle a lower cost option.

The other end 38 of shaft 32 is formed into a hook end 40. Hook end 40 may be formed into a variety of shapes. The shape shown in FIG. 2 is shown in moredetail in FIG. 5c in which hook end 40 has a pointed end 42 and a groove 44. The other shapes of the hook end shown in FIG. 5 are discussed below.

The hook is used as follows. In one form of the method, pointed end 42 of shaft 32 is inserted into an entrance point at one end of the bait. In FIG. 3, the entrance point 28 is in the head of worm 20. Pointed end 24 is pushed relatively easily longitudinally through the worm 20 and exits through an exit point 29 at the other end of the worm. It is best to have exit point 29 some distance from the end of the tail 26.

After hook end 40 of tool 30 emerges from exit point 29, loop 18 of leader 12 is engaged by groove 44 of the tool. The tool is then withdrawn from 20 thereby pulling leader 12 through the worm such that the loop end 18 protrudes from the head 24 of worm 20, and fish hook 10 protrudes from tail end 26 of the worm (FIG. 4). The short tail end 26 of worm 20 that extends beyond exit point 29 and fish hook 10 helps attract fish. Those that bite near the tail should also bite the fish hook, but the worm is secure on the leader and will not fall off of the fish hook.

Another form of the method is illustrated in FIG. 1. There, tool 31 has a slightly different handle 35, and, as shown in FIG. 5e, groove 45 is at the center of pointed end 43 of hook end 41. In this method, loop 18 of leader 12 engages groove 45 before tool 31 is inserted into worm 20. Fish hook 10 is pulled back toward handle 35 so that leader 12 lies along shaft 33.

Next, pointed end 43 is inserted at an entrace point preferably in front of tail 26 of worm 20 and pushed longitudinally through the worm until it exits at an exit point at or near the front of the head of the worm. Tool 31 is pushed far enough so that fish hook 10 is in approximately the same position relative to the worm as is shown in FIG. 4. At this position, loop 18 of leader 12, which protrudes from the head of end 24, is disengaged from groove 45, and tool 31 is pulled back through the worm while the leader stays in place. Using both of these methods, the hook and leader are positioned the same, and it is merely a matter of choice of the fisherman which method will be chosen.

The other modifications of the hook end of the tool are shown in FIGS. 5a, 5b and 5d. In FIG. 5a, hook end 50 has a relatively narrow side opening 52, which opens into a relatively narrow central opening 54. The opening has a rear end 56 and a front end 58. End 50 (FIG. 5a) is more versatile than hook ends 40 or 41 in FIGS. 5c and 5e because it can be used to perform the method illustrated in FIGS. 1 or 3 rather than just one of them.

FIGS. 5b and 5d are equally versatile. End 60 (FIG. 5d) has a somewhat wider sideopening 62 than the one shown in FIG. 5a, and the central opening 64 is likewise wider than the one shown in FIG. 5a. End 60 can also be used with either method. Likewise, end 68 (FIG. 5b) can also be used with either method. Instead of a central opening, there are two grooves 70 and 72 angled in opposite direction. Groove 70 is used for the first method (FIG. 3) in pulling the leader through the worm, and groove 72 is used in the second method (FIG. 1) in pushing the leader through the worm.

The apparatus and method of the present invention performs well and is quite useful in fishing with worm and other elongated bait. Although the discussion has primarily involved worms, the tool can be used with any type of live bait. For example, rather than putting a hook through the back of the shell of a shrimp, the tool could be used to thread the leader through the body of the shrimp.

The method described places the hook near the tail of the worm, but the positioning can be varied as the fisherman chooses. The hook could protrude at or near the head of the worm, with the loop end of the leader protruding from or near the tail. Likewise, the hook could protrude the center of the worm leaving a longer tail to act as a lure for fish.

Various modifications and changes may be made in the configuration described above that come within the spirit of the invention. The invention embraces all such changes and modifications coming with the scope of the appended claims.

We claim:

1. A tool for inserting a leader through a live worm or worm-like bait comprising:
 a narrow shaft having a forward pointed end for being inserted through bait;
 first and second notches in the shaft adjacent the pointed end and adjacent each other, each notch having adjacent, intersecting sidewalls, the first notch being closer to the pointed end of the shaft then the second notch, the first notch pulling the leader through the bait when the leader is attached to the first notch after the tool is inserted through the bait, the second notch pulling the leader through the bait when the leader is attached to the second notch before the shaft is inserted through the bait, and wherein the shaft is round and the pointed end is generally flat, the notches being formed in the flat portion of the shaft.

2. The tool of claim 1 wherein the sidewalls of each notch are at acute angles to each other.

3. The tool of claim 1 wherein the notches are each at an acute angle to the longitudinal axis of the shaft.

4. The tool of claim 1 further comprising a handle attached to the end of the shaft opposite the pointed end for gripping the device.

5. The tool of claim 1 wherein one sidewall of the first notch intersects one sidewall of the second notch.

* * * * *